United States Patent
Richardson (10) Patent No.: US 7,324,011 B2
(45) Date of Patent: Jan. 29, 2008

(54) METHOD AND SYSTEM FOR PIPELINE COMMUNICATION

(75) Inventor: John G. Richardson, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 68 days.

(21) Appl. No.: 10/825,804

(22) Filed: Apr. 14, 2004

(65) Prior Publication Data

US 2005/0231382 A1    Oct. 20, 2005

(51) Int. Cl.
*G01V 3/00* (2006.01)

(52) U.S. Cl. .............................. 340/854.5; 340/870.18; 340/870.3

(58) Field of Classification Search ............. 340/854.5, 340/870.18, 870.3, 870.09, 870.1, 853.3; 166/97.5
See application file for complete search history.

(56) References Cited

U.S. PATENT DOCUMENTS

| | | |
|---|---|---|
| 2,488,195 A | 11/1949 | Ivey |
| 3,477,019 A | 11/1969 | Hartmann |
| 3,596,269 A | 7/1971 | Laska |
| 3,740,522 A | 6/1973 | Muehlberger |
| 3,742,350 A | 6/1973 | White |
| 3,814,616 A | 6/1974 | Kondo et al. |
| 3,826,301 A | 7/1974 | Brooks |
| 4,092,950 A | 6/1978 | Hart |
| 4,106,332 A | 8/1978 | McKeown |
| 4,172,252 A | 10/1979 | Wiberg |
| 4,340,010 A | 7/1982 | Hart |
| 4,420,251 A | 12/1983 | James et al. |
| 4,472,621 A | 9/1984 | Blackmore |
| 4,477,725 A | 10/1984 | Asawa et al. |
| 4,514,443 A | 4/1985 | Kostecki |
| 4,529,974 A | 7/1985 | Tanaka et al. |
| 4,661,682 A | 4/1987 | Gruner et al. |
| 4,677,371 A | 6/1987 | Imaizumi |
| 4,704,985 A | 11/1987 | Rubinstein |

(Continued)

FOREIGN PATENT DOCUMENTS

DE    3740498 A1    6/1989

(Continued)

OTHER PUBLICATIONS

"Pathways for Enhanced Integrity, Reliability and Deliverability," Sep. 2000, US Department of Energy Office of Fossil Energy and the National Energy Technology Laboratory. Report No. DOE/NETL-2000/1130.

*Primary Examiner*—Anh V. La
(74) *Attorney, Agent, or Firm*—Trask Britt (57) ABSTRACT

A pipeline communication system and method includes a pipeline having a surface extending along at least a portion of the length of the pipeline. A conductive bus is formed to and extends along a portion of the surface of the pipeline. The conductive bus includes a first conductive trace and a second conductive trace with the first and second conductive traces being adapted to conformally couple with a pipeline at the surface extending along at least a portion of the length of the pipeline. A transmitter for sending information along the conductive bus on the pipeline is coupled thereto and a receiver for receiving the information from the conductive bus on the pipeline is also couple to the conductive bus.

22 Claims, 4 Drawing Sheets

U.S. PATENT DOCUMENTS

| | | | |
|---|---|---|---|
| 4,736,157 | A | 4/1988 | Betker et al. |
| 4,756,194 | A | 7/1988 | Grandpierre et al. |
| 4,774,905 | A | 10/1988 | Nobis |
| 4,853,515 | A | 8/1989 | Willen et al. |
| 4,926,165 | A | 5/1990 | Lahlouh et al. |
| 4,928,004 | A | 5/1990 | Zimmermann et al. |
| 4,996,419 | A | 2/1991 | Morey |
| 5,015,958 | A | 5/1991 | Masia et al. |
| 5,024,423 | A | 6/1991 | Matsumoto et al. |
| 5,167,983 | A | 12/1992 | Liu et al. |
| 5,181,962 | A | 1/1993 | Hart |
| 5,185,183 | A | 2/1993 | Gonda et al. |
| 5,195,046 | A | 3/1993 | Gerardi et al. |
| 5,254,820 | A | 10/1993 | Pesheck et al. |
| 5,279,148 | A | 1/1994 | Brandes |
| 5,369,366 | A | 11/1994 | Piesinger |
| 5,379,644 | A | 1/1995 | Yanagida et al. |
| 5,394,141 | A * | 2/1995 | Soulier .................... 340/854.4 |
| 5,410,255 | A | 4/1995 | Bailey |
| 5,412,173 | A | 5/1995 | Muehlberger |
| 5,416,280 | A | 5/1995 | McDermott et al. |
| 5,446,448 | A | 8/1995 | Zufelt et al. |
| 5,551,484 | A | 9/1996 | Charboneau |
| 5,573,814 | A | 11/1996 | Donovan |
| 5,602,492 | A | 2/1997 | Cresswell et al. |
| 5,743,299 | A | 4/1998 | Chick et al. |
| 5,847,286 | A | 12/1998 | Klein et al. |
| 5,951,761 | A | 9/1999 | Edstrom |
| 6,004,639 | A | 12/1999 | Quigley et al. |
| 6,058,978 | A | 5/2000 | Paletta et al. |
| 6,085,413 | A | 7/2000 | Klassen et al. |
| 6,194,890 | B1 | 2/2001 | Doyle et al. |
| 6,197,168 | B1 | 3/2001 | Matsunaga et al. |
| 6,210,972 | B1 | 4/2001 | Williams et al. |
| 6,271,754 | B1 | 8/2001 | Durtler |
| 6,320,400 | B1 | 11/2001 | Black et al. |
| 6,362,615 | B1 | 3/2002 | Davidson et al. |
| 6,370,964 | B1 | 4/2002 | Chang et al. |
| 6,492,898 | B1 * | 12/2002 | Sabbattini et al. ....... 340/854.9 |
| 6,498,568 | B1 | 12/2002 | Austin et al. |
| 6,501,278 | B1 | 12/2002 | Arabi |
| 6,567,006 | B1 | 5/2003 | Lander et al. |
| 6,575,663 | B2 | 6/2003 | Kostelnik et al. |
| 6,626,244 | B2 | 9/2003 | Powers |
| 6,715,550 | B2 * | 4/2004 | Vinegar et al. ........ 166/250.15 |
| 6,916,502 | B2 * | 7/2005 | Moore et al. ............... 427/236 |
| 7,049,811 | B2 | 5/2006 | Schlicker et al. |
| 2001/0027708 | A1 | 10/2001 | Stewart et al. |
| 2002/0022757 | A1 | 2/2002 | Kostetnik et al. |
| 2003/0047317 | A1 | 3/2003 | Powers |
| 2003/0152427 | A1 | 8/2003 | Nickelson et al. |
| 2003/0161946 | A1 | 8/2003 | Moore et al. |
| 2003/0175083 | A1 | 9/2003 | Kostelnik et al. |
| 2003/0183015 | A1 | 10/2003 | Richardson et al. |
| 2003/0190194 | A1 | 10/2003 | Kostelnik et al. |
| 2003/0198517 | A1 | 10/2003 | Kostelnik et al. |
| 2004/0045365 | A1 | 3/2004 | Richardson |
| 2005/0092098 | A1 | 5/2005 | Richardson et al. |
| 2005/0170683 | A1 | 8/2005 | Richardson |
| 2005/0284232 | A1 | 12/2005 | Rice |

FOREIGN PATENT DOCUMENTS

| | | |
|---|---|---|
| JP | 58-011057 | 1/1983 |
| JP | 85018462 B | 5/1985 |
| JP | 2002060923 A | 2/2002 |

* cited by examiner

METHOD AND SYSTEM FOR PIPELINE COMMUNICATION

GOVERNMENT LICENSE RIGHTS

The United States Government has rights in the following invention pursuant to Contract Number DE-AC07-99ID13727 between the U.S. Department of Energy and Bechtel BWXT Idaho, LLC.

BACKGROUND OF THE INVENTION

1. Field of the Invention

The present invention relates generally to a network for providing a communication system in a pipeline environment. More particularly, the present invention relates to a communication network configured to utilize at least a portion of the physical structure of a pipeline system as structured support for a communication network.

2. State of the Art

It is frequently desirable to provide a communication link along subsurface and surface pipelines. One benefit of establishing a communication network along at least a portion of a length of a pipeline, such as a gas or liquid pipeline results from the fact that such pipelines conventionally traverse an appreciable distance and monitoring and communicating along at least a portion of the length of the pipeline may improve performance and compliance with safety regulations. Yet another benefit for establishing a communication network along a pipeline results from governmental regulations wherein a pipeline configured for continuous monitoring is allowed to sustain higher mass flow rates when such pipelines are continuously monitored for stress and/or defects. Otherwise, a pipeline traversing populated areas may be "derated" below its actual capacity due to safety considerations. In order to qualify for such a mass flow rate variance, the continuous monitoring must occur over some form of secure network to prevent tampering with sensor information indicative of pipeline conditions.

Various types of communication techniques along a pipeline structure have been proposed, including embedding fiber optics or other conductive communication conduits into the pipeline structure itself. Such integral modifications to the piping are generally unacceptable for various reasons, including the required modification to pipe fabrication techniques and requalification of the modified piping structure in accordance with various stress and reliability criteria. Therefore, such an embedded approach is undesirable.

Furthermore, structure of communication networks applied to the exterior of a pipeline system also present various security issues. Such externally accessible transmission media are not only subjected to ambient environmental conditions but are also exposed to security and tampering risks. Therefore, there is a need to provide a communication structure suitable for forming a communication network along at least a portion of a pipeline system, that does not require reengineering, modified fabrication and requalification of the pipeline structure and is not easily accessible for tampering or subject to other destructive failure mechanisms.

BRIEF SUMMARY OF THE INVENTION

The present invention is directed to a method and system for pipeline communication. In one embodiment of the present invention, a pipeline communication system is provided. The system includes a pipeline having a surface extending along at least a portion of the length of the pipeline. A conductive bus is formed to, and extends along a portion of, the surface of the pipeline. A transmitter for sending information along the conductive bus on the pipeline is coupled thereto and a receiver for receiving the information from the conductive bus on the pipeline is also coupled to the conductive bus. Digital communication and, more specifically communication according to a serial protocol, may be employed for sending information.

In another embodiment of the present invention, a pipeline communication bus is provided. The pipeline communication bus includes a conductive bus including a first conductive trace and a second conductive trace with the first and second conductive traces being adapted to conformally couple with a pipeline at a surface extending along at least a portion of the length of the pipeline. A transmitter interface is adapted to operably send information along the conductive bus and a receiver interface is adapted to operably receive information along the conductive bus.

In yet another embodiment of the present invention, a method of communicating along a pipeline is provided. Conductive traces are formed and conformally coupled to a pipeline at a surface extending along at least a portion of the length of the pipeline. Information is transmitted along the plurality of conductive traces and the information is received from the plurality of conductive traces.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
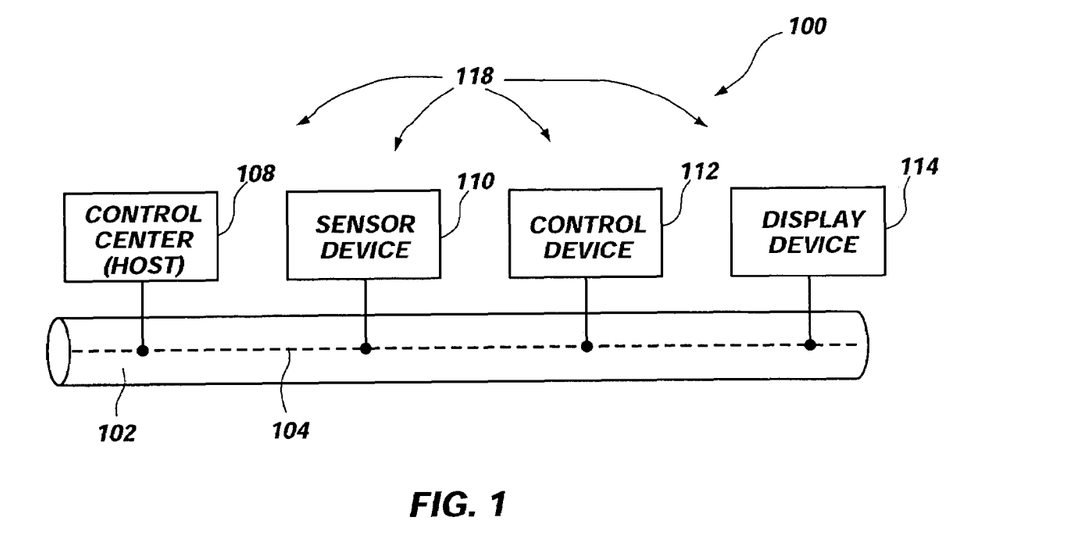
FIG. 1 is a system level diagram illustrating a pipeline communication system, in accordance with an embodiment of the present invention.

FIG. 1 illustrates a pipeline communication system, in accordance with an embodiment of the present invention. The pipeline communication system 100 includes a pipeline or other conduit 102 configured for passing therein a form of liquid or gas (hereinafter "fluid medium") for transportation between mutually remote locations. Pipeline or conduit 102 may be made from various materials including electrically conductive and electrically insulative materials. Furthermore, pipeline or conduit 102 may be located on the surface of the earth, may be at least partially exposed thereabove or may be buried beneath the surface, or furthermore may exist in a submerged environment such as, for example, in a river, lake, canal, harbor, bay or other body of water.

Pipeline communication system 100 further includes a conductive bus 104 coupled at least to a portion of a length of a pipeline or conduit 102. Conductive bus 104 may be conductive to one or more forms of electromagnetic waves, namely electrical or optical conductivity. Furthermore, the electromagnetic waves may include analog and digital waveforms that may further employ various modulation schemes known by those of ordinary skill in the art. In one embodiment of the present invention, conductive bus 104 attaches or, alternatively, is formed thereto an exterior or interior surface of pipeline or conduit 102. The formation and attachment of conductive bus 104 to pipeline or conduit 102 is further described hereinbelow.

Pipeline communication system 100 further includes one or more interface nodes 118, a sampling of which are illustrated with reference to FIG. 1. Exemplary interface nodes 118 may include a host 108 configured, for example, within a control center which further couples to various input/output (IO) devices, an example of which includes a sensor device 110, a control device 112, and a display device 114. Sensor device 110 may comprise any one or a combination of several of a myriad of sensor devices, including pressure sensors for detecting the local pressure within the pipeline or conduit 102 as well as chemical sensors for detecting the consistency or composition of the fluid medium within pipeline or conduit 102. Sensor device 10 may further comprise flow sensors for determining a flow rate of a fluid medium through pipeline or conduit 102 as well as temperature sensors for monitoring environmental conditions resident within pipeline or conduit 102. In addition to the aforementioned sensor devices which find application for measuring and sensing a characteristic of the fluid medium flowing within the pipeline or conduit 102, sensors specific to the condition or state of structural integrity of the pipeline or conduit 102 may include sensor devices specific to the measurement of stress, strain, acceleration or other characteristics of pipeline or conduit 102 which may be indicative of gradual or catastrophic changes to the pipeline or conduit 102.

Control devices 112 may include valve devices for baffle mechanisms for regulating or gating the flow of a fluid medium through pipeline or conduit 102. Furthermore, display devices 114 may present status information regarding including safety alerts or other notifications of interest.

Figure 2:
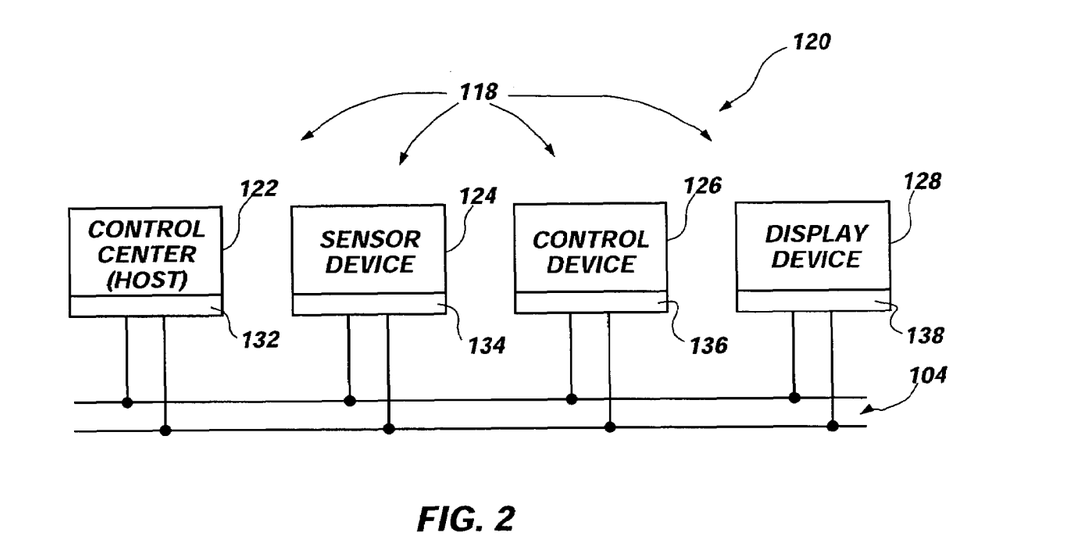
FIG. 2 illustrates a pipeline communication bus in accordance with an embodiment of the present invention.

FIG. 2 illustrates a pipeline communication bus, in accordance with an embodiment of the present invention. A communication system 120 includes various interface nodes 118, namely host device 122, sensor device 124, control device 126 and display device 128. The various interface nodes 118 electrically couple to conductive bus 104 in a shared bus network topology. Each of the respective interface nodes 118 further comprise respective network interfaces 132-138 configured for compatible communications on a shared conductive bus 104.

In one embodiment of the present invention, network interfaces 132-138 and conductive bus 104 are configured for digital communication, and specifically to operate in accordance with a serial bus topology, an example of which is an RS-485 standard. Specifics of the operation of the RS-485 are available from IEEE of New York, N.Y., and generally is implemented using a differential voltage source as seen by the transmission line or conductive bus 104. Generally speaking, the RS-485 protocol allows multiple devices, up to 32, to communicate at half duplex on a single pair of conductors, such as conductive bus 104 with data transmitted differentially on two separate conductors.

Figure 3:
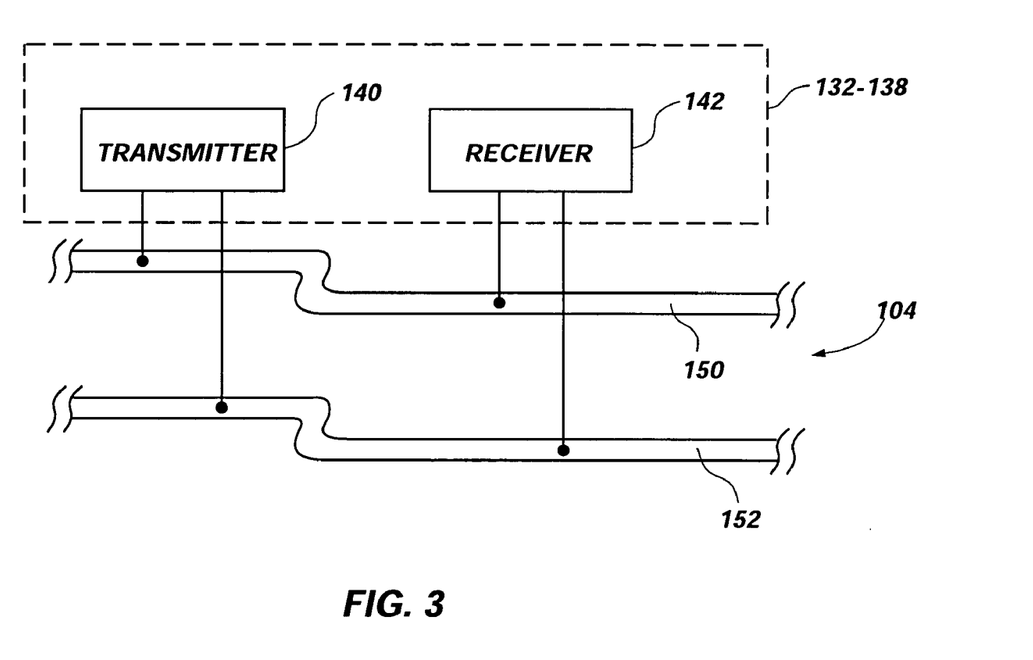
FIG. 3 illustrates a portion of a communication bus coupled to electrically conductive traces configured to conduct electrical signals between one or more nodes on a pipeline communication system, in accordance with an embodiment of the present invention.

With reference to FIG. 3, a transmitter 140 and a receiver 142 of each device or interface are connected to each of the conductors 150, 152 of the conductive bus 104. Each of the interface nodes 118 (FIG. 2) is addressable allowing each node to be communicated with independently. In an exemplary configuration utilizing an RS-485 protocol, only one device can drive the conductive bus 104 at a time; therefore, drivers within the transmitter must be put into a high-impedance mode when not in use. Other specifics relating to the RS-485 specification are readily available and are known by those of ordinary skill in the art. Other serial bus protocols are also contemplated as acceptable alternatives.

In one embodiment of the present invention, the conductive bus 104 is configured as a transmission line. According to transmission line theory, a traveling waveform along a long distance requires the study of how the system reacts to different frequencies. In one embodiment of the present invention, a transmission line is comprised of conductors 150, 152 fabricated according to trace-forming techniques such as plasma-spraying of a conductive strip of metal onto an insulative substrate.

In accordance with an embodiment of the present invention, the conductive material is plasma-sprayed onto a dielectric media that is attached to a rigid, for example, ferromagnetic conductor such as a pipeline or conduit 102 (FIG. 1). A pipeline communication system is then established using the formed conductive bus 104 as the transmission line. Encrypted data may then be transmitted over long distances along the transmission line to improve security and tamper resistance and may occur according to readily available encryption standards. In an exemplary embodiment of the present invention, the conductor 150, 152 or trace may be modeled according to a classical lossy transmission line. Accordingly, characteristics pertaining to plasma spraying properties and finite model topology are of significance.

Plasma Spraying Properties

Generally, plasma spraying involves the spraying of molten or at least heat-softened material onto a surface to provide a coating. A powdered form of the material to be sprayed is injected into a high temperature plasma gas where it is rapidly heated and accelerated to a high velocity. When carried out correctly, plasma spraying is effected as a so-called "cold process", in that the substrate being coated is kept at a low temperature during processing to avoid damage, metallurgical changes and distortion to the substrate material.

In one example, the plasma spray gun comprises a copper anode and tungsten cathode, both of which are water-cooled. Plasma gas consisting of one or a combination of one or more of argon, nitrogen, hydrogen, and helium flows around the cathode and through the anode, which is configured as a constricting nozzle. The plasma is initiated by a high voltage discharge that causes localized ionization and a conductive path for a DC arc to form between cathode and anode. The resistance heating from the arc causes the gas to reach extreme temperatures, dissociate and ionize to form a plasma stream. The plasma exits the anode nozzle as a free, or neutral, plasma flame that by definition does not carry electric current. When the plasma is stabilized for spraying, the electric arc extends down and out the nozzle, instead of shorting out to the nearest edge of the anode nozzle. This "stretching" of the arc is due to a thermal pinch effect. Cold gas around the surface of the water-cooled anode nozzle, being electrically non-conductive, constricts the plasma arc, raising its temperature and velocity. Powder is fed into the plasma flame via an external powder port mounted near the anode nozzle exit. The powder is superheated and accelerated along the path of the plasma until the particulate matter reaches the substrate where it rapidly cools and forms a coating.

Figure 4A:
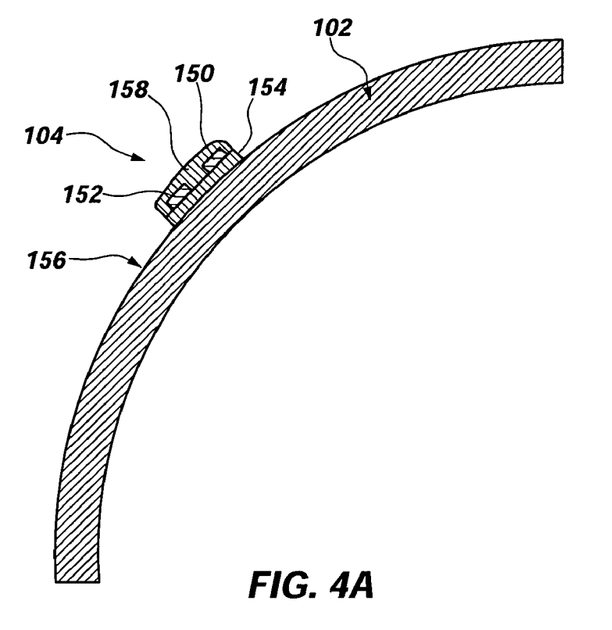
FIGS. 4A and 4B are partial sectional views of a pipeline structure including the electrically conductive traces within a pipeline communication system, in accordance with an embodiment of the present invention.
Figure 4B:
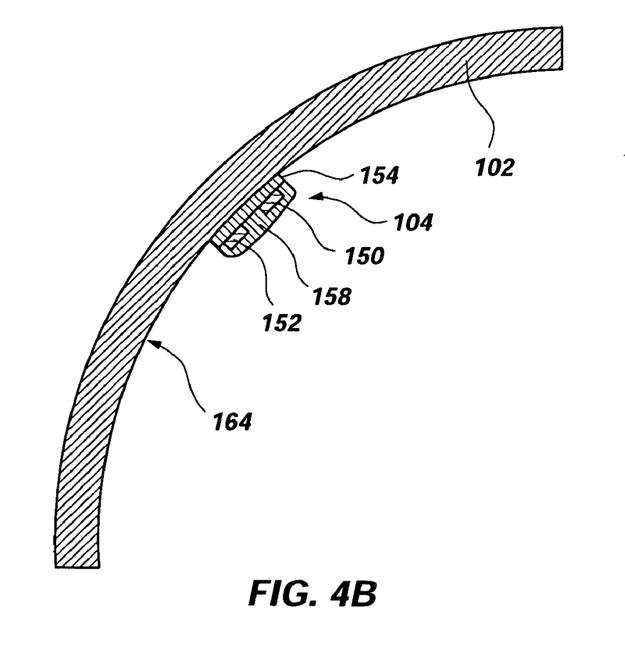

Plasma spraying is primarily a technique used in welding technologies to help fill in voids left through normal wear of metallic objects or to add a corrosion, abrasion or erosion resistant coating to a substrate comprising vulnerable material. However, the process can be applied to form thin, uniform strips when employed under the right conditions and controls. With reference to FIGS. 4A and 4B and in accordance with an embodiment of the present invention, the formation of conductors 150, 152 to the pipeline or conduit 102 is described. First, for purposes of enhancing bond strength between the pipeline or conduit 102 and the conductive, sprayed material, an insulative layer 154, an example of which is a layer of alumina (aluminum oxide) is sprayed to a uniform thickness over the pipeline or conduit 102. The alumina also serves as an insulator to prevent any conductivity between the pipeline or conduit and the conductor or trace formed thereon.

A thin plastic mask (not shown) may be attached to the alumina to serve as a guide to give the conductive portion of the sprayed material used to form the traces a substantially uniform edge and width. Mask width, therefore, controls the overall width of the conductive traces. A robotic control arm may be used to spray the length of the pipeline or conduit at a constant speed and volumetric spray rate to give the first conductive layer a uniform thickness. By varying the speed of the robotic arm travel, the volumetric spray rate, or both the thickness of a conductive material layer may be adjusted. Adjustment of the dimensions of both the traces and the alumina insulator may be used to alter the actual characteristics of the system.

When applied, the process of plasma spraying is generally not a completely uniform process from a chemical standpoint. A cross-sectional view illustrates partially melted particles, the presence of oxides, the presence of air gaps and voids and inconsistent edges. Such flaws affect the electrical characteristics of the system. For example, if the powdered form of the conductive material were completely solidified, it would have a relatively constant bulk resistivity. However, the presence of oxides and voids changes the resistivity and changes the overall characteristics of the system. In one example, acceptable percentages for the sprayed conductive material were approximately 30% air gaps and voids, 40% oxides, and 30% solid material.

Finite Model Topology

A model for the two-wire transmission line system follows a direct analysis of the physical system of two conductive traces sprayed on top of a dielectric media on a long pipeline or conduit. Basic physics and definitions of resistance, inductance, and capacitance provide a majority of the significant components and corresponding calculations.

An overall system configuration is determined assuming the data is transmitted down one trace and returned down another similar trace with a differential voltage driver. A physical model determines at least eight contributing components to the system. The eight components are as follows:

Series Resistance of the Trace=$R_T$;
Series Resistance of the Pipe=$R_P$;
Parallel Resistance between Traces=$R_{TT}$;
Parallel Resistance between a Trace and the Pipe=$R_{TP}$;
Series Inductance of the Trace=$L_T$;
Series Inductance of the Pipe=$L_P$;
Parallel Capacitance between Traces=$C_{TT}$; and
Parallel Capacitance between a Trace and the Pipe=$C_{TP}$.

A series circuit element is determined to be along the intended path of the current, which is down the length of the pipe. A parallel circuit element is determined to be between the intended forward and return paths of the current or in parallel with any other grounding surface. When the system is expressed on a per length basis as most transmission line circuits are, the result of the model is a three-line system with parameters similar to the classical two-line system.

Since the conductive trace is determined to be carrying a current, each trace must have a resistive element along the path of the current. Unlike the classical lossy-transmission line model, each trace has an individual resistance associated with it. The reason that the classical addition of series components cannot be used is due to the fact that a third conductor is placed in close proximity to the two line system. In all actuality, the third line serves as a ground. This introduction of a ground plane also introduces several new components that alter the performance of the transmission line. However, the classical transmission line model may be used as a basis for constructing the three line model. As with any conductor, a resistive element occurs when currents flow through the conductors. Also since the transmission line sends data with AC portions in opposite directions at various frequencies, an inductive element in both the traces and the pipe is added. There will be inductance in each element due to the nature of the current flow between the two traces, as well as inductance from the "ground plane" behavior of the pipeline. For modeling, a simple three line system simplifies by treating each physical component as a line over which current can travel. Outside of the inductance interaction between components, there is no interaction between lines at this point on a per length ($\Delta Z$) basis.

Along with the series circuit topology, a parallel circuit topology is also present since the highly resistive alumina element, when sandwiched between the conductive trace and the pipeline ground, form a parallel plate capacitor because of the differential voltage between the conductive traces and ground. Alumina, for example, serves as a dielectric media for the capacitive model component. Assuming that the pipeline carries almost no current (ground), the voltage differential and current between the trace and the pipe wall provide adequate charge to form the capacitance ($C_{TP}$). There is also a less significant parallel-plate capacitor ($C_{TT}$) formed between the two parallel lines in the same fashion.

Also, with the possibility of current leaking into the pipe that serves as an effective ground, a leakage resistance element is associated with the length of the pipe or to the outside environment. The leakage resistance will most likely be very large due to the presence of the alumina insulator's very low conductivity. However, because the alumina is not a perfect insulator, there is an extremely low amount of current leakage between the elements. The exact value of the leakage resistance is based upon the conductivity of the alumina layer and the thickness at which it is applied. Therefore, a leakage resistance will be associated between all three lines relative to each other.

The result of all of the elements together gives the model for the communication system of the present invention. The final result is a three line system with eight components with a final model appearing similar to two classical transmission line systems sandwiched together with resistive and inductive values put on the ground line. Also, a resistive and capacitive component may be added between the two major data lines.

In one embodiment of the present invention, conductive traces may be used for the formation of conductive bus 104. Referring to FIGS. 4A and 4B, a partial cross-sectional view is shown of conductors 150 and 152 utilizing conductive traces according to one embodiment of the present invention. The conductors 150, 152, shown as conductive traces, may be attached to pipeline or conduit 102 by the thermal spray process described above, namely by applying the conductive traces to pipeline or conduit 102. The surface of pipeline or conduit 102 may be degraded and/or conductive and in such embodiments, it may be desirable to provide an insulative layer 154 directly on the surface, for example an outer surface 156, as shown with reference to FIG. 4A, of the pipeline or conduit 102. An insulative layer inhibits the conductors 150, 152 from forming an electrical connection with the pipeline or conduit 102, and also provides a substantially uniform surface on which to form the conductors 150, 152. One insulative layer 154 may be formed and sized such that all of the conductors 150, 152 may be formed thereon or, alternatively, an individual layer 154 may be formed as a base for each individual conductor 150 and 152 as may be desired. A second insulative layer 158 may be formed to encompass or encapsulate the conductors 150, 152 to electrically isolate them from each other and from the surrounding environment.

In one embodiment of the present invention as illustrated with reference to FIG. 4A, the conductive bus 104 is fabricated on the external surface 156 of the pipeline or conduit 102. In yet another embodiment of the present invention as illustrated with reference to FIG. 4B, the conductive bus 104 is fabricated on an internal surface 164 of pipeline or conduit 102. Fabrication of both embodiments may include, for example, an insulative layer 154 formed of, for example, alumina, with conductive traces of an electrically conductive material, such as copper, nickel-aluminum, silver or other forms of electrically conductive material. In order to encapsulate the conductive traces 150, 152, a second insulative layer 158 may be formed of, for example, alumina. Likewise, while other suitable materials may be utilized for the electrically conductive traces 150, 152, other suitable materials may also be utilized in forming the insulative layers 154, 158.

In the embodiments of the present invention such as those shown with reference to FIGS. 4A and 4B, the conductive bus may be formed by thermal (plasma) spraying of the insulative layers 154, 158 and/or the conductive traces 150, 152. In one exemplary embodiment, a thermal sprayed insulative layer 154 may be approximately 0.5 inches wide and 0.12 to 0.15 inches thick. The conductive traces 150, 152 may be formed with individual widths of approximately 0.125 inches with a lateral space between each of conductive traces 150, 152 of approximately 0.25 inches. Conductive traces 150, 152 may further comprise a thickness of approximately 0.007 inches.

An exemplary thermal spraying device which may be used in conjunction with the application of insulative layers 154, 158 and conductive traces 150,152 is disclosed in pending U.S. patent application Ser. No. 10/074,355 entitled SYSTEMS AND METHODS FOR COATING CONDUIT INTERIOR SURFACES UTILIZING A THERMAL SPRAY GUN WITH EXTENSION ARM, filed on Feb. 11, 2002, which application is assigned to the assignee of the present invention and the entirety of the disclosure of which is incorporated by reference herein.

Figure 5:
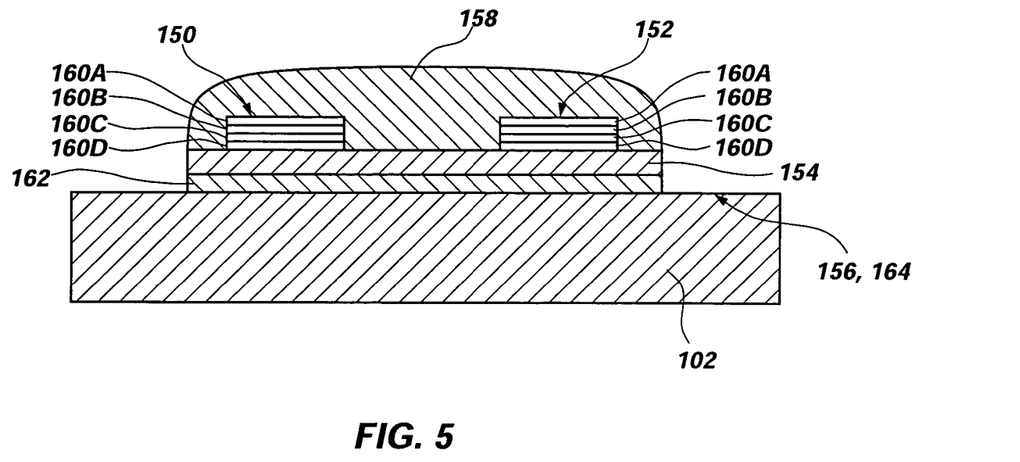
FIG. 5 is a partial cross-sectional view of a plurality of conductive traces formed to a pipeline structure, in accordance with an embodiment of the present invention.

With reference to FIG. 5, the conductive traces 150, 152 may be formed by building up individual, superimposed layers 160A-160D of conductive material until a desired thickness or height of the conductive traces 150, 152 is obtained. Similarly, if so desired or needed, the insulative layers 154, 158 may also be layered to obtain a desired thickness or height. Additionally, if so needed, a bonding agent or bonding layer 162 may be used between the insulative layer 154 and a surface 156, 164 if the surface of the pipeline or conduit 102 exhibits a degree of nonuniformity or degradation.

What is claimed is:

1. A pipeline communication system, comprising:
   a pipeline having a first surface extending along at least a portion of a length of the pipeline;
   a conductive bus formed to and extending along a portion of the first surface of the pipeline, the conductive bus electrically insulated from the pipeline;
   a transmitter operably coupled to the conductive bus for sending information along; and
   a receiver operable coupled to the conductive bus for receiving the information therefrom.

2. The pipeline communication system of claim 1, wherein the conductive bus comprises a plurality of conductive traces, each of the traces conformally fabricated to the surface of the pipeline.

3. The pipeline communication system of claim 2, wherein the plurality of conductive traces comprise thermally sprayed, electrically conductive material.

4. The pipeline communication system of claim 2, wherein the conductive bus further comprises a first insulative layer formed between the surface of the pipeline and the plurality of conductive traces, the first insulative layer located to electrically isolate the plurality of conductive traces from the surface of the pipeline.

5. The pipeline communication system of claim 4, further comprising a bonding layer coupled between the surface and the first insulative layer, the bonding layer configured to planarize the surface before coupling the conductive bus thereto.

6. The pipeline communication system of claim 4, wherein the conductive bus further comprises a second insulative layer formed over the plurality of conductive traces, the second insulative layer located to physically protect and electrically insulate the plurality of conductive traces.

7. The pipeline communication system of claim 1, wherein the surface of the pipeline is an exterior surface.

8. The pipeline communication system of claim 1, wherein the surface of the pipeline is an interior surface.

9. The pipeline communication system of claim 1, wherein the transmitter and receiver are configured for communication according to a serial bus protocol utilizing the conductive bus for communicating therebetween according to the serial bus protocol.

10. The pipeline communication system of claim 9, wherein the serial bus protocol is configured according to an RS-485 protocol.

11. A pipeline communication bus, comprising:
   a conductive bus including a first conductive trace and a second conductive trace, the first and second conductive traces adapted to conformally couple with a pipeline at a first surface extending along at least a portion of the length of the pipeline, the conductive bus electrically insulated from the pipeline;
   a transmitter interface adapted to operably send information along the conductive bus; and
   a receiver interface adapted to operably receive information along the conductive bus.

12. The pipeline communication bus of claim 11, wherein the conductive bus, the transmitter interface and the receiver interface are configured according to a serial bus protocol utilizing the conductive bus for communicating between the transmitter and receiver interfaces according to the serial bus protocol.

13. The pipeline communication bus of claim 11, wherein the first and second conductive traces are comprised of thermally sprayed, electrically conductive material.

14. The pipeline communication bus of claim 11, wherein the conductive bus further comprises a first insulative layer formed between the surface of the pipeline and the first and second conductive traces, the first insulative layer located to electrically isolate the first and second conductive traces from the surface of the pipeline.

15. The pipeline communication bus of claim 14, wherein the conductive bus further comprises a second insulative layer formed over the first and second conductive traces, the second insulative layer located to physically protect and electrically insulate the first and second conductive traces.

16. A method of communicating along a pipeline, comprising:
   forming a plurality of conductive traces conformally coupled to a pipeline at a surface extending along at least a portion of the length of the pipeline, the plurality of conductive traces electrically insulated from the pipeline;
   transmitting information along the plurality of conductive traces; and
   receiving the information from the plurality of conductive traces.

17. The method of claim 16, wherein the transmitting information and the receiving information further comprises transmitting and receiving according to a serial bus protocol utilizing the plurality of conductive traces for communicating between the transmitter and receiver interfaces according to the serial bus protocol.

18. The method of claim 16, wherein forming a plurality of conductive traces comprises thermally spraying electrically conductive material on the first surface of the pipeline to form the plurality of conductive traces.

19. The method of claim 18, further comprising forming a first insulative layer between the first surface of the pipeline and the plurality of conductive traces, the first insulative layer located to electrically isolate the plurality of conductive traces from the surface of the pipeline.

20. The method of claim 19, further comprising forming a second insulative layer over the plurality of conductive traces, the second insulative layer located to physically protect and electrically insulate the plurality of conductive traces.

21. The method of claim 16, wherein the forming a plurality of conductive traces further comprises forming the plurality of conductive traces on the surface, wherein the surface is an exterior surface of the pipeline.

22. The method of claim 16, wherein the forming a plurality of conductive traces further comprises forming the plurality of conductive traces on the surface, wherein the surface is an interior surface of the pipeline.

* * * * *